United States Patent [19]

Stech

[11] Patent Number: 4,842,046

[45] Date of Patent: Jun. 27, 1989

[54] SLIM-LINE VAN HEATER/AIR CONDITONER UNIT

[75] Inventor: James D. Stech, Elkhart, Ind.

[73] Assignee: Quality Components, Inc., Elkhart, Ind.

[21] Appl. No.: 146,842

[22] Filed: Jan. 22, 1988

[51] Int. Cl.$^4$ ............................................. B60H 1/00
[52] U.S. Cl. ...................................... 165/42; 165/41; 237/30; 237/70
[58] Field of Search ............................ 165/41, 42, 43; 237/123 B, 123 A, 30, 43

[56] References Cited

U.S. PATENT DOCUMENTS

| | | | |
|---|---|---|---|
| 1,884,408 | 10/1932 | Van Vulpen et al. | 165/42 |
| 1,905,040 | 4/1933 | Melcher | 165/42 X |
| 2,126,497 | 8/1938 | Parsons | 98/2.03 |
| 2,134,724 | 11/1938 | McClanahan et al. | 165/43 |

FOREIGN PATENT DOCUMENTS 2327695 12/1974 Fed. Rep. of Germany ........ 165/41

Primary Examiner—Samuel Scott
Assistant Examiner—Allen J. Flanigan
Attorney, Agent, or Firm—Thomas J. Dodd

[57] ABSTRACT

A vehicle heater/air conditioner which includes heating and cooling coils enclosed within a housing and in flow communication with a blower member which pushes air through the housing. The housing containing the heating and cooling coils is positioned generally between the inner and outer vehicle side walls for conservation of space.

8 Claims, 1 Drawing Sheet

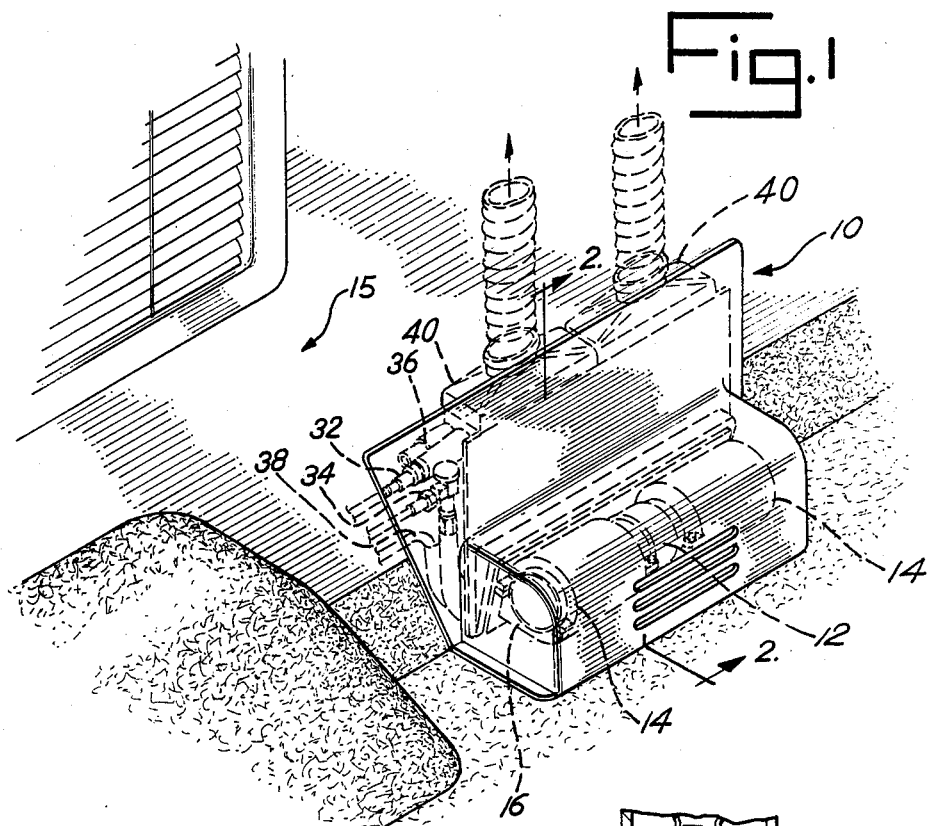
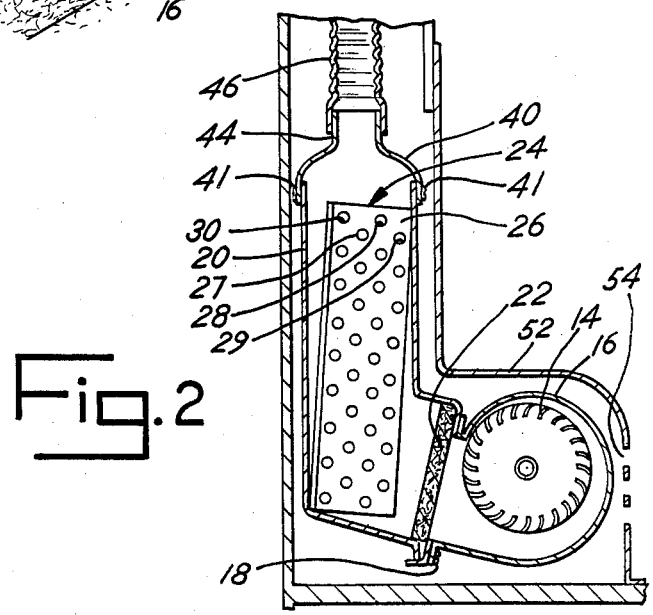

SLIM-LINE VAN HEATER/AIR CONDITONER UNIT

SUMMARY OF THE INVENTION

This invention relates to a vehicles heating and air conditioning units and will have specific application to a combined heater/air conditioner which is substantially housed within the vehicle side wall.

Heretofore, air conditioning units used in mobile homes or vans or the like usually inclue a large bulky unit which is either housed on top of the vehicle or underneath one of the rearward seats. The obvious problem associated with such bulky air conditioning units is the space required by the unit which either reduces the amount of usable cabin space or if housed on top of the vehicle, creates excessive drag. Further a separate unit is generally required to heat the vehicle, thus, raising the cost of the vehicle. This invention eliminates these problems by providing for a combined heating/air conditioning unit which is generally enclosed between the vehicle's inner and outer side walls. The heating and air conditioning hoses are guided through the vehicle side wall along with the flexible tubes which lead to various air ducts within the vehicle. The only interior space consumed by the unit is that required to house the blower fans and motor which extend a few inches outwardly from the van side wall.

Accordingly, it is an object of this invention is to provide for a combined heater/air conditioner for use with a vehicle.

Another object of this invention is to provide for a heater/air conditioner unit which can be housed within the side wall of a vehicle.

Another object of this invention is to provide for a heater/air conditioner which requires a small amount of the vehicle's interior space.

Other objects of this invention will become apparent upon a reading of the following description taken along with the accompanying drawings.

BRIEF DESCRIPTION OF THE DRAWINGS

FIG. 1 is a perspective view of the heater/air conditioner of this invention shown in use in a vehicle.

FIG. 2 is a fragmentary sectional view taken along line 2—2 of FIG. 1.

DESCRIPTION OF THE PREFERRED EMBODIMENT

The preferred embodiment herein described is not intended to be exhaustive or to limit the invention to explain to the precise form disclosed. It is chosen and described to explain the principle of the invention and its application and practical use to enable others skilled in the art to utilize the invention.

As shown in the drawings, the combination heater/air conditioner unit 10 includes an electric motor 12 which is connected at its oppositely extending shafts in a conventional manner to blower fans 14. Motor 12 is connected to an electric power source (not shown) within vehicles 15.

Blower fans 14 and motor 12 are enclosed by blower housing 16 which is connected by fasteners such screw 18 to heat exchanger housing 20. Housing 20 accommodates an air filter 22 which is positioned directly in front of blower fans 14.

A heat exchanger unit 24 is positioned within housing 20 and includes a multitude of heat exchanger fins 26 (one shown), air conditioning coils 27, 28 and 29 and a heating coil 30. Air conditioner coils 27, 28 and 29 are mutually connected and adapted for connection to an air conditioner compressor (not shown) by an inlet connector 32 and an outlet connector 34. In a similar fashion, heating coil 30 is adapted for connection into the water coolant system (not shown) of vehicle 15 by inlet connector 36 and outlet connector 38. The heat exchanger unit 24 is constructed as is common in the industry so that air conditioning coils 27, 28 and 29 are each reverse bent across the entire length of the heat exchanger unit as is heater coil 30. So as to maximize the heat transfer capabilities of the unit the heater and air conditioning coils are passed through in contact with fins 26 which increase the surface area exposed to the blown air.

A pair of manifolds 40 are connected to the upper end of coil housing 20 by fasteners such as screws 41, and include a projecting mouth 44. A flexible hose 46 is connected at one end to each projecting mouth 44 of manifolds 40. The other ends of flexible hose 46 is connected to various air outlet ducts (not shown) throughout the vehicle (not shown).

As depicted in FIG. 2, coil housing 20 with heat exchanger unit 24 enclosed therein is positioned between the vehicle outer wall 48 and the vehicle inner wall 50 with flexible tubes 46 extending upwardly between the walls. Motor 12 and blower fans 14 are located adjacent the vehicle floor and extend a slight distance into the vehicle's interior. Inner wall 50 extends about motor 12 and fans 13 at its wall portion 52 which includes air inlet slots 54.

In operation, upon motor 12 being activated, blower fans 14 rotate so as to blow air through filter 22 and across heat exchanger unit 24. The air blow through filter 22 and heat exchanger unit 24 will either be heated by coil 30 or cooled by coils 27, 28 and 29 as selected by the the vehicle user and will exit the heating/air conditioning unit 10 through flexible tubes 46 in the direction shown by arrows 56, into the vehicle air ducts (not shown) to heat or cool the vehicle.

It is understood that the invention is not limited to the above given details but may be modified within the scope of the appended claims.

I claim:

1. A heat exchanger unit in combination with a vehicle having an outer and an inner side wall, said unit including a heat exchanger means for cooling or warming air, blower means for delivering said air to said heat exchanger means, duct means in air flow communication with said heat exchanger means for delivering said air to an interior of said vehicle, said heat exchanger means enclosed by a housing, the improvement wherein said housing and said heat exchanger means are positioned substantially between an outer side wall and an inner side wall of said vehicle, said blower means in air flow communication with said heat exchanger means and including a housing enclosing the blower means connected to said heat exchanger means housing.

2. The heat exchanger of claim 1 wherein said blower means is in air flow communication between said heat exchanger means and the interior of said vehicle through said inner side wall.

3. The heat exchanger of claim 2 wherein said blower means is located adjacent a floor of said vehicle.

4. The heat exchanger of claim 2 and including a filter element positioned between said blower means and said heat exchanger means.

5. The heat exchanger of claim 1 wherein said heat exchanger unit includes a core having tubing for accommodating a cooling fluid and separate tubing for accommodating a heating fluid.

6. A heat exchanger unit in combination with a vehicle having an outer and an inner side wall, said unit including a heat exchanger means for cooling or warming air, blower means for delivering said air to said heat exchanger means, duct means in air flow communication with said heat exchanger means for delivering said air to an interior of said vehicle, said heat exchanger means enclosed by a housing, said housing and said heat exchanger means positioned substantially between an outer side wall and an inner side wall of said vehicle, said blower means in air flow communication between said heat exchanger means and the interior of said vehicle through said inner side wall.

7. A heat exchanger of claim 6 and including a filter element positioned between said blower means and said heat exchanger means.

8. A heat exchanger of claim 6 wherein said blower means is located adjacent a floor of said vehicle.

* * * * *